United States Patent
Klinkhammer et al.

(10) Patent No.: US 9,308,798 B2
(45) Date of Patent: Apr. 12, 2016

(54) OPTIMIZED FACE MODE AIR FLOW PATH FOR REAR QUARTER HVAC

(75) Inventors: John Klinkhammer, Canton, MI (US); Jason Hendry, Milford, MI (US); Simon Hotte, Windsor (CA)

(73) Assignee: Denso International Ameria, Inc., Southfield, MI (US)

( * ) Notice: Subject to any disclaimer, the term of this patent is extended or adjusted under 35 U.S.C. 154(b) by 871 days.

(21) Appl. No.: 13/525,797

(22) Filed: Jun. 18, 2012

(65) Prior Publication Data

US 2013/0333858 A1 Dec. 19, 2013

(51) Int. Cl.
*B60H 1/00* (2006.01)

(52) U.S. Cl.
CPC .. *B60H 1/00028* (2013.01); *B60H 2001/00242* (2013.01)

(58) Field of Classification Search
CPC ........... B60H 1/00007; B60H 1/00028; B60H 1/0005; B60H 1/00535; B60H 2001/00107; B60H 1/002; B60H 1/00242; B60H 1/00221
USPC ....................... 165/202–204, 239, 244, 41, 42
See application file for complete search history.

(56) References Cited

U.S. PATENT DOCUMENTS

| | | | | |
|---|---|---|---|---|
| 3,381,493 | A * | 5/1968 | Dixon | 62/244 |
| 4,432,213 | A * | 2/1984 | Katahira et al. | 62/239 |
| 4,674,294 | A * | 6/1987 | D'Agaro | 62/243 |
| D290,747 | S * | 7/1987 | Tigner et al. | D23/325 |
| 5,054,378 | A * | 10/1991 | Speece | 454/137 |
| 5,950,711 | A | 9/1999 | Bendell | |
| 6,131,652 | A * | 10/2000 | Ito et al. | 165/204 |
| 6,382,305 | B1 | 5/2002 | Sano | |
| 6,443,253 | B1 * | 9/2002 | Whitehead et al. | 180/68.1 |
| 2003/0029609 | A1 * | 2/2003 | Kuribayashi et al. | 165/203 |
| 2004/0182561 | A1 * | 9/2004 | Ozeki et al. | 165/202 |
| 2006/0065388 | A1 * | 3/2006 | Newman et al. | 165/202 |

FOREIGN PATENT DOCUMENTS

| | | |
|---|---|---|
| JP | 07-024613 | 5/1995 |
| JP | 10-109523 | 4/1998 |
| JP | H10109523 A | 4/1998 |
| JP | H11-189027 | 7/1999 |
| JP | 2004-182159 | 7/2004 |
| JP | 2005-035423 | 2/2005 |
| JP | 2006-056451 | 3/2006 |
| JP | 2007-161019 | 6/2007 |

(Continued)

OTHER PUBLICATIONS

Office Action issued Jul. 21, 2014 in corresponding DE Application No. 10 2013 209 871.5 (with English translation).

(Continued)

*Primary Examiner* — Travis Ruby
(74) *Attorney, Agent, or Firm* — Harness, Dickey & Pierce, P.L.C.

(57) ABSTRACT

A rear HVAC system for a motor vehicle including a housing, an airflow generator, an evaporator, and a heater. The housing is configured to be mounted adjacent to a rear wheel well and a D-pillar of the motor vehicle. The evaporator and the heater are mounted within the housing. Both the evaporator and the heater are between a vehicle floor and a line that is both generally parallel to the floor and tangent to an upper surface of the rear wheel well when the housing is installed in the vehicle.

23 Claims, 6 Drawing Sheets

(56) References Cited

FOREIGN PATENT DOCUMENTS

| | | |
|---|---|---|
| JP | 2007-302027 | 11/2007 |
| JP | 2008-094295 | 4/2008 |
| JP | 2010-006199 | 1/2010 |
| JP | 2011-218823 | 11/2011 |
| KR | 2005-0119822 | 12/2005 |

OTHER PUBLICATIONS

Final Rejection issued Nov. 4, 2014 in corresponding JP Application No. 2013- 001321 (with English translation).
Office action dated Mar. 25, 2014 in corresponding Japanese Application No. 2013-001321.
Office Action dated Mar. 25, 2015 in corresponding Chinese Patent Application No. 2013 1021 6953.7.

* cited by examiner

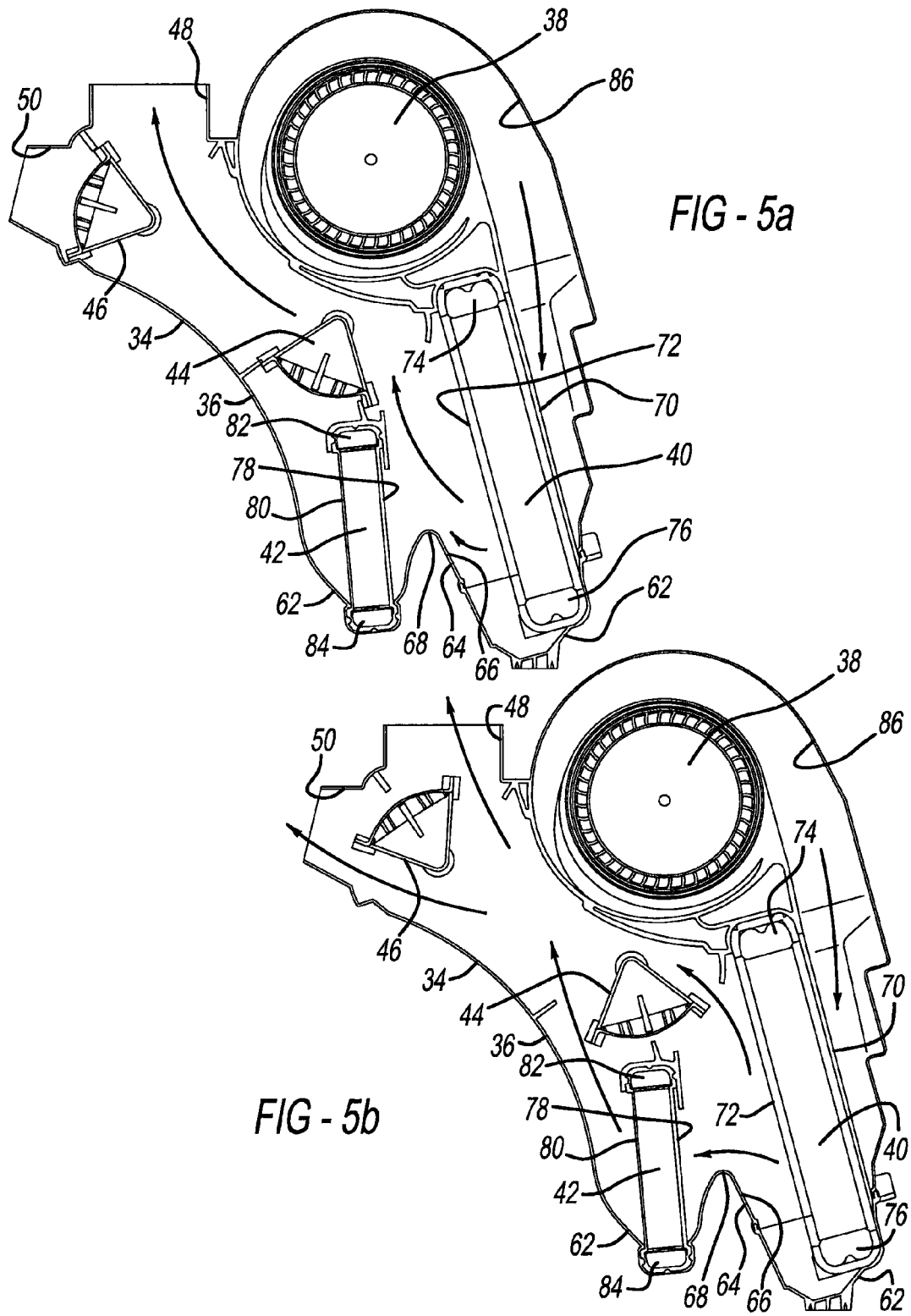

US 9,308,798 B2

OPTIMIZED FACE MODE AIR FLOW PATH FOR REAR QUARTER HVAC

FIELD

The present disclosure relates to vehicle heating, ventilation, and air conditioning systems.

BACKGROUND

This section provides background information related to the present disclosure which is not necessarily prior art.

Extended length vehicles, such as station wagons, vans, and sport utility vehicles, may include heating ventilation and air conditioning (HVAC) systems mounted in a rear of the vehicle. The size and configuration of such rear HVAC systems limits where in the vehicle they can be placed. Rear HVAC systems are thus often mounted above the rear wheel well, which reduces the amount of passenger cabin space available to occupants of the vehicle. Rear HVAC systems often include an evaporator and a heater arranged such that airflow generated by a fan of the system cannot reach the heater directly. Instead, airflow is deflected against one or more walls of a housing before reaching the heater, which reduces operating efficiency.

SUMMARY

This section provides a general summary of the disclosure, and is not a comprehensive disclosure of its full scope or all of its features.

The present teachings provide for a rear HVAC system for a motor vehicle. The system includes a housing, an airflow generator, an evaporator, and a heater. The housing is configured to be mounted adjacent to a rear wheel well of the motor vehicle. The evaporator and the heater are both mounted within the housing. When the housing is installed in the vehicle, both the evaporator and the heater are between a vehicle floor and a line that is both generally parallel to the floor and tangent to an upper surface of the rear wheel well.

The present teachings also provide for a rear HVAC system for a motor vehicle including a housing, an airflow generator, an evaporator, and a heater. The housing is configured to be mounted adjacent to a rear wheel well of the motor vehicle. The evaporator is mounted in the housing. The evaporator includes a first evaporator side and a second evaporator side opposite to the first evaporator side. Airflow generated by the airflow generator enters the evaporator at the first evaporator side and exits the evaporator at the second evaporator side. The heater is mounted in the housing. The heater includes a first heater side and a second heater side opposite to the first heater side. Airflow generated by the airflow generator enters the heater at the first heater side and exits the heater at the second heater side. The first heater side faces the second evaporator side.

The present teachings further provide for a rear HVAC system for a motor vehicle including a housing, an airflow generator, an evaporator, and a heater. The housing is configured to be mounted between a rear wheel well and a D-pillar of the motor vehicle. The housing includes a base configured to be mounted at a floor of the vehicle. The evaporator is mounted in the housing and includes a top evaporator end opposite to a bottom evaporator end. The heater is mounted in the housing. The heater includes a top heater end opposite to a bottom heater end. The top heater end is mounted closer to the base of the housing than the top evaporator end. Both the evaporator and the heater are between a vehicle floor and an upper surface of the rear wheel well when the housing is installed in the vehicle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 5a is a cross-sectional view of the HVAC system in a ventilation or air conditioning mode;

FIG. 5b is a cross-sectional view of the HVAC system in a bi-level mode; and

Corresponding reference numerals indicate corresponding parts throughout the several views of the drawings.

DETAILED DESCRIPTION

Example embodiments will now be described more fully with reference to the accompanying drawings.

Figure 1:
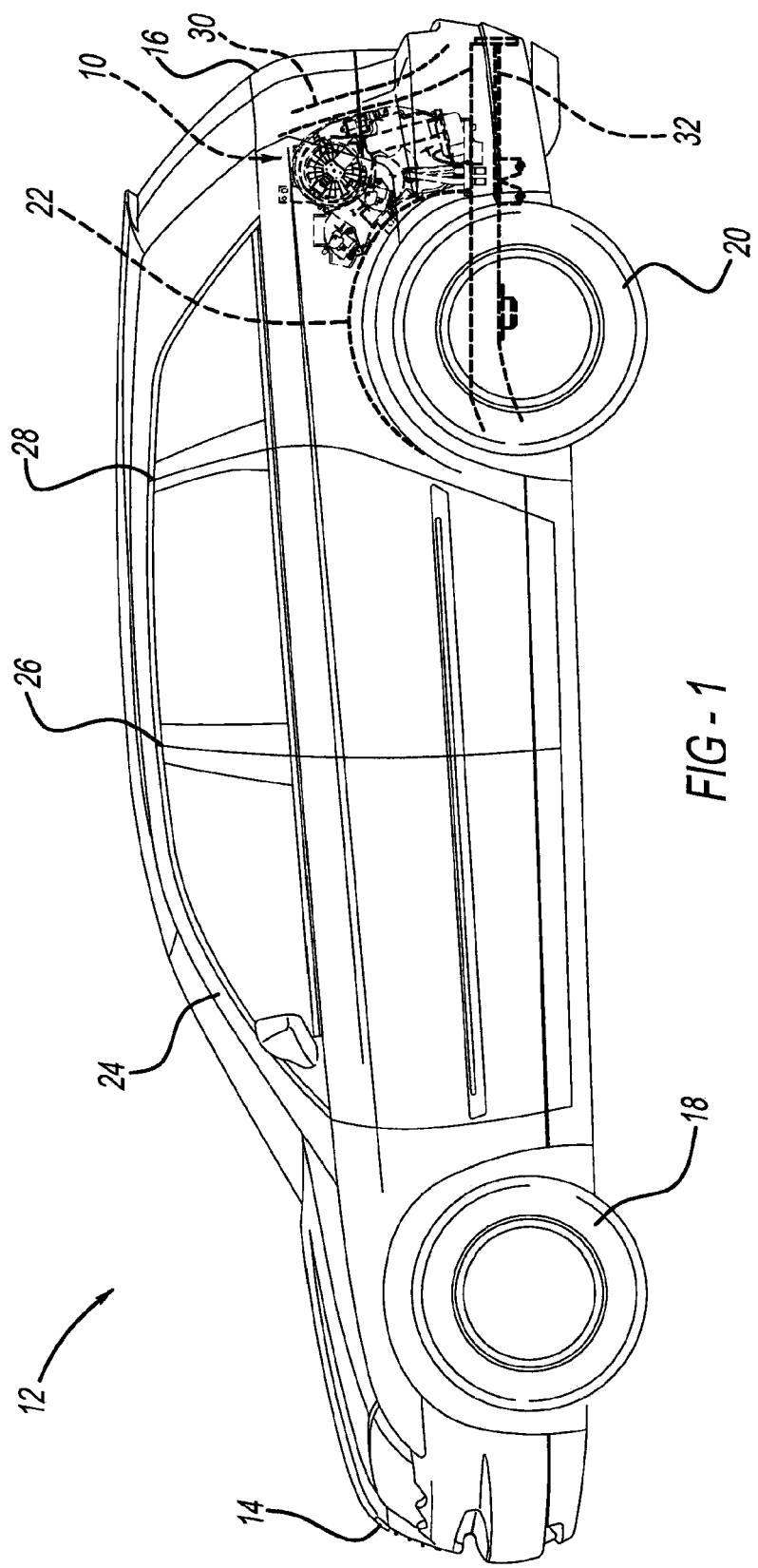
FIG. 1 is a side view of a motor vehicle including a rear HVAC system according to the present teachings.

With initial reference to FIG. 1, a rear heating ventilation and air conditioning (HVAC) system 10 according to the present teachings is illustrated as installed in an exemplary vehicle 12. The vehicle 12 generally includes a front end 14 and a rear end 16. At the front end 14 is a front wheel 18, and at the rear end 16 is a rear wheel 20. The rear wheel 20 is accommodated within a rear wheel well 22. The vehicle 12 includes a plurality of support pillars, such as an A-pillar 24, a B-pillar 26, a C-pillar 28, and a D-pillar 30. The rear HVAC system 10 is arranged between the rear wheel well 22 and the D-pillar 30, or at any other suitable location in the vehicle. The rear HVAC system 10 is ultimately supported by a frame 32 of the vehicle 12. The rear HVAC system 10 can be installed in any suitable vehicle in addition to the vehicle 12 as illustrated. For example, the rear HVAC system 10 can be installed in a van, a bus, a motor home, a recreational vehicle, a military vehicle, a sport utility vehicle, or most any other vehicle having an extended length, particularly vehicles that include a D-pillar. While the rear HVAC system 10 is illustrated and described as being located between the rear wheel well 22 and the D-pillar 30, the rear HVAC system 10 can be located at any suitable location in the vehicle 12, and the rear HVAC system 10 can be mounted in vehicles that do not include the D-pillar 30.

Figure 2:
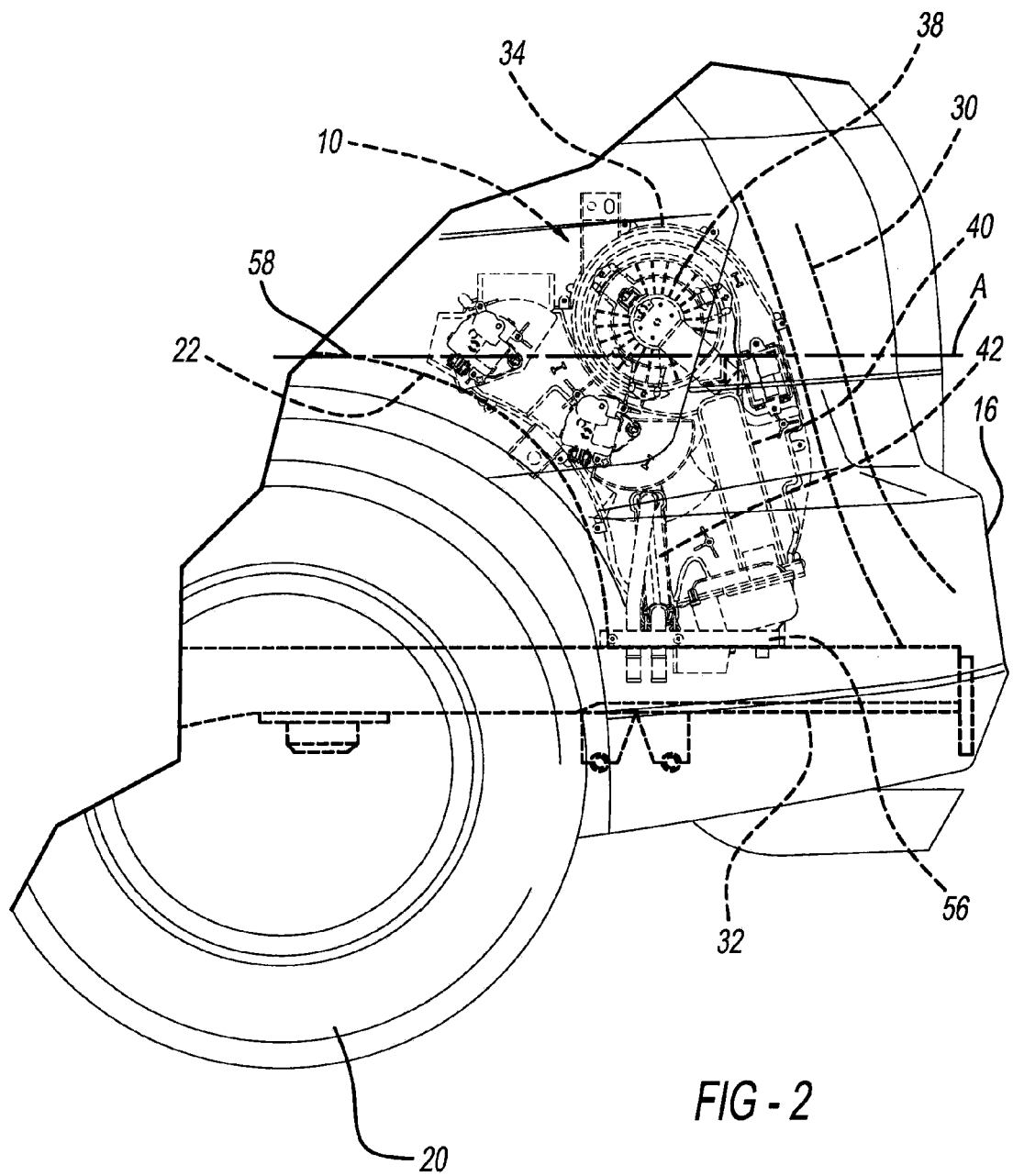
FIG. 2 illustrates a rear portion of the vehicle of FIG. 1 including the HVAC system according to the present teachings.
Figure 3:
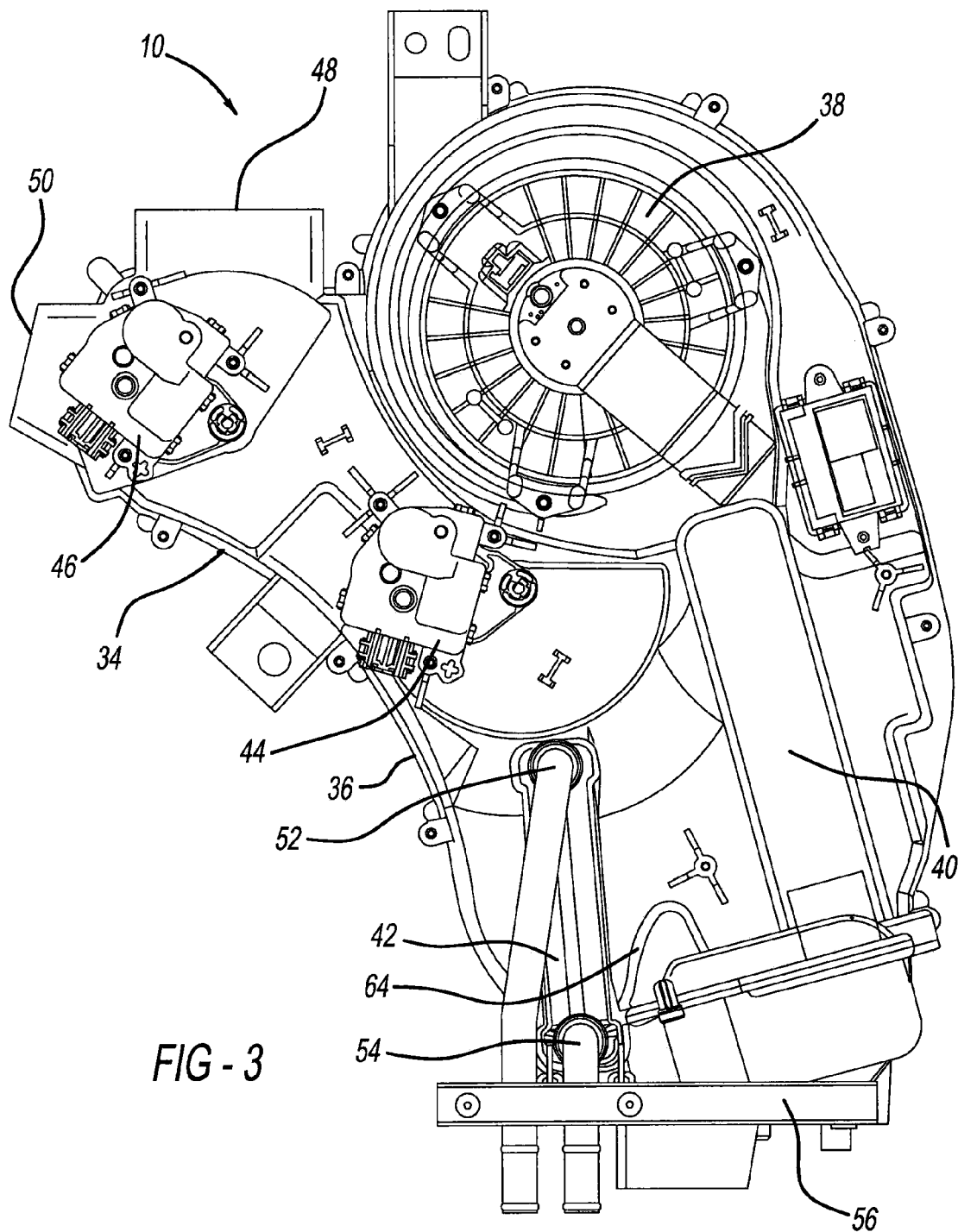
FIG. 3 is a side view of the HVAC system according to the present teachings.

With additional reference to FIGS. 2 and 3, the rear HVAC system 10 generally includes an HVAC housing 34. The housing 34 includes therein a fan 38, an evaporator 40, a heater 42, a first door 44, and a second door 46. The HVAC housing 34 defines a face outlet 48 and a foot outlet 50. Extending from the HVAC housing 34 and the heater 42 is a first pipe 52 and a second pipe 54. The HVAC housing 34 is mounted to a floor 56 of the vehicle 12.

The rear HVAC system 10 is mounted to the floor 56 of the vehicle 12 between the rear wheel well 22 and the D-pillar 30. More specifically and with reference to FIG. 2, the rear HVAC system 10 is arranged such that a curved wall 36 of the HVAC housing 34 is proximate to or abuts the rear wheel well 22. The evaporator 40 and the heater 42 are arranged in close proximity to the floor 56, and can be mounted at the floor 56 of the vehicle 12. With respect to an upper portion 58 of the rear wheel well 22, the evaporator 40 and the heater 42 are arranged between the floor 56 and a line A, which is tangent to the upper portion 58 and generally parallel to the floor 56. Thus, the length of the first pipe 52 and the second pipe 54, which extend from the heater 42 to the floor 56, can be shortened and straightened to increase operating efficiency as compared to systems where the heater 42 is arranged further from the floor 56, such as further than the evaporator 40.

Figure 4:
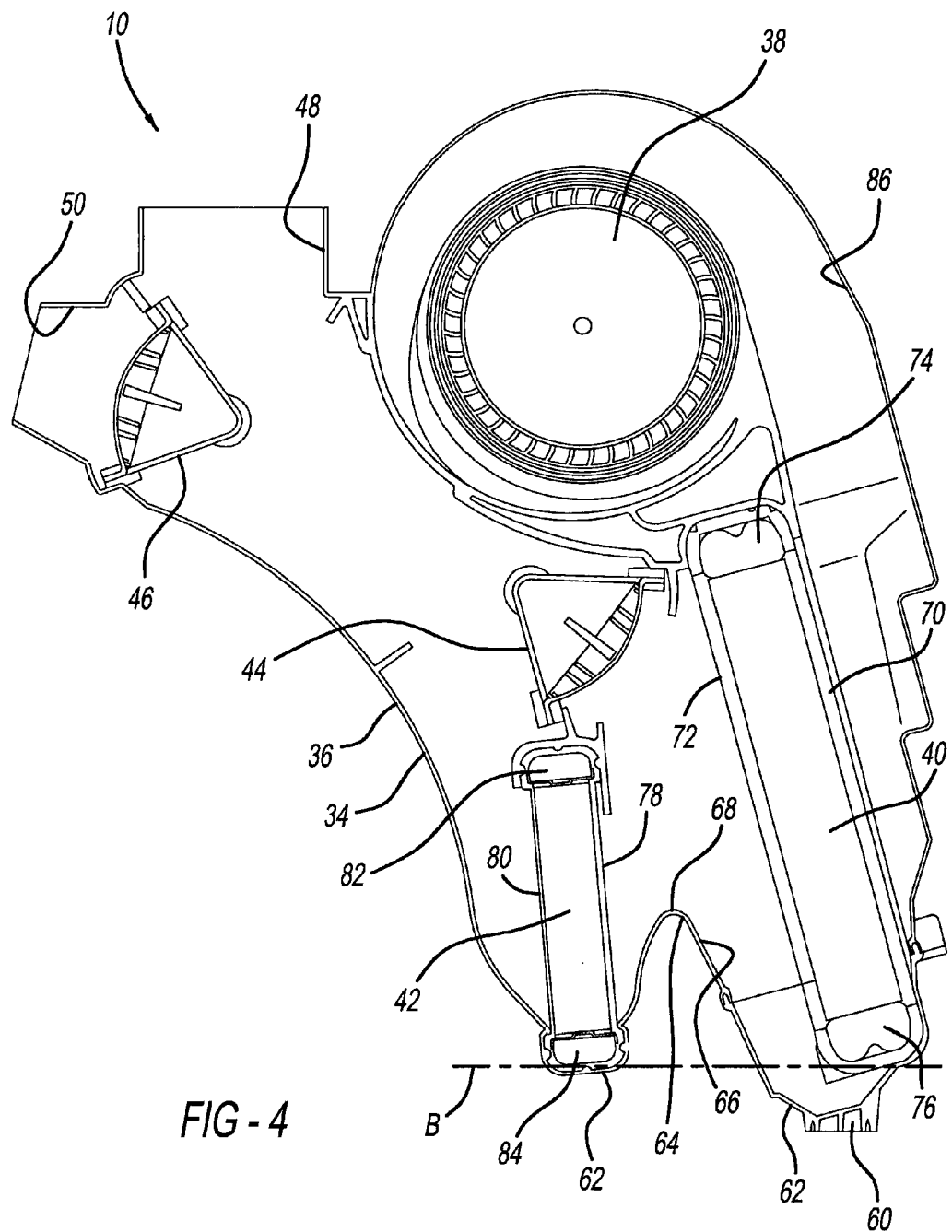
FIG. 4 is a cross-sectional view of the HVAC system.

With reference to FIG. 4, additional features of the rear HVAC system 10 will now be described. A base 62 of the HVAC housing 34 includes or defines a drain 60. The drain 60 is proximate to the evaporator 40, and thus allows moisture from the evaporator 40 to drain out from within the HVAC housing 34. Also at the base 62 of the HVAC housing 34 is a deflector 64. The deflector 64 is an airflow deflector formed by a portion of the base 62 that extends upward from the floor 56 of the vehicle 12 into a space between the evaporator 40 and the heater 42. The deflector 64 includes a deflector face 66 and a deflector apex 68. The deflector face 66 deflects airflow that has passed through the evaporator 40 away from the heater 42 and toward both the face outlet 48 and the foot outlet 50. The apex 68 is between the evaporator 40 and the heater 42, and is generally aligned with a mid-point of a length of the heater 42.

The evaporator 40 generally includes a first side 70 and a second side 72 that is opposite to the first side 70. A top end 74 of the evaporator 40 is opposite to a bottom end 76. The top end 74 is mounted proximate to the fan 38, and the bottom end 76 is mounted proximate to the base 62.

The heater 42 includes a first side 78 and a second side 80, which is opposite to the first side 78. A top end 82 of the heater 42 is opposite to a bottom end 84. The evaporator 40 and the heater 42 are spaced apart and extend at a slight angle to one another, such that the top ends 74 and 82 are closer together than the bottom ends 76 and 84. The bottom ends 76 and 84 are generally aligned with one another along a line B, which extends generally parallel to the floor 56 of the vehicle 12. Thus the bottom ends 76 and 84 are generally arranged equidistant to the floor 56. The first and second sides 70 and 72 of the evaporator 40 are each longer than the first side 78 and the second side 80 of the heater 42. Thus, the top end 74 of the evaporator 40 is not aligned with the top end 82 of the heater 42. The top end 74 of the evaporator 40 extends further from the base 62 than the top end 82 of the heater 42 does, and thus the top end 74 of the evaporator 40 is closer to the fan 38 than the top end 82 of the heater 42 is. An entirety of the first side 78 of the heater 42 faces the second side 72 of the evaporator 40. Because the second side 72 of the evaporator 40 is longer than the first side 78 of the heater 42, portions of the second side 72 extend beyond the top end 82 of the heater 42 and less than an entirety of the second side 72 opposes the first side 78 of the heater 42.

The first door 44 is moveable between a first position, illustrated in FIG. 4, and a second position, illustrated in FIG. 5a. In the first position, the first door 44 restricts airflow from flowing from between the evaporator 40 and the heater 42 out to the face outlet 48 or the foot outlet 50. Thus, in the first position the first door 44 is arranged adjacent to or between the evaporator 40 and the heater 42. In the second position (FIG. 5a), the first door 44 is positioned between the heater 42 and the curved wall 36 of the HVAC housing 34. Therefore, in the second position the first door 44 prevents air from flowing from the second side 80 of the heater 42 out to either the face outlet 48 or the foot outlet 50. The first door 44 can also be positioned in an intermediate position, as illustrated in FIG. 5b. In the intermediate position, the first door 44 permits air to flow to the face outlet 48 and foot outlet 50 directly from the evaporator 40 and from the heater 42, as further described herein.

Figure 5C:
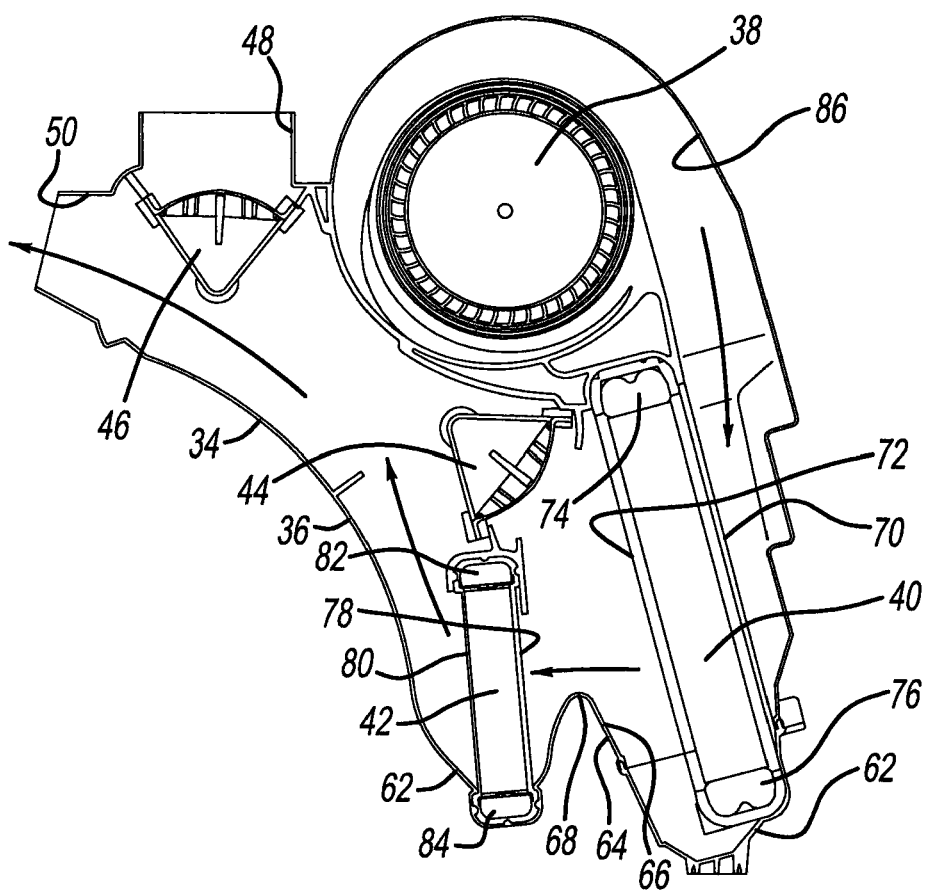
FIG. 5c is a cross-sectional view of the HVAC system in a heating mode.

The second door 46 is rotatable between a first position (FIG. 4) in which the second door 46 blocks air from flowing out through the foot outlet 50, and a second position (FIG. 5c), in which the second door 46 blocks the face outlet 48, but permits air to flow out through the foot outlet 50. The second door 46 can also be positioned in an intermediate position, as illustrated in FIG. 5b, in which the second door 46 allows air to flow out through both the face outlet 48 and the foot outlet 50. While the first door 44 and the second door 46 are generally described and illustrated as rotary doors, any suitable door or airflow direction device can be used, such as a butterfly door.

With reference to FIGS. 5a, 5b, and 5c, operation of the rear HVAC system 10 will now be described. Airflow through the rear HVAC system 10 is generated by the fan 38, while the fan 38 is illustrated as a rotary fan, any suitable fan or airflow generating device can be used. Airflow from the fan 38 travels through airflow path 86 defined by the HVAC housing 34 between the fan 38 and the evaporator 40. The airflow enters the evaporator 40 through the first side 70, which faces the airflow path 86, and exits the evaporator 40 through the second side 72. When in air conditioning mode, the evaporator 40 is activated to cool airflow as it passes through the evaporator 40. When in ventilation or heating mode, the evaporator 40 is not activated, and thus airflow exiting the evaporator 40 at the second side 72 will generally have the same temperature as when the airflow entered the evaporator 40 through the first side 70.

When in the air conditioning or ventilation mode, the first door 44 of the rear HVAC system 10 will be arranged in the second position, as illustrated in FIG. 5a. When the first door 44 is in the second position, high pressure is created at the first side 78 of the heater 42 proximate to the deflector 64 to force airflow exiting the evaporator 40 at the second side 72 to flow towards the outlets 48 and 50, and not through the heater 42. The deflector 64 further aids in directing airflow away from the heater 42 and towards the outlets 48 and 50. If airflow is desired at upper portions of a cabin of the vehicle 12, such as at the face of an occupant, the second door 46 will be arranged in the first position so that airflow can flow through the face outlet 48. If airflow is desired at the feet of an occupant, the second door 46 can be moved to the second position to obstruct the face outlet 48 and permit air to flow through the foot outlet 50.

With additional reference to FIG. 5b, bi-level mode of the rear HVAC system 10 is illustrated. In the bi-level mode, the first door 44 is about mid-way between the first position and the second position. Similarly, the second door 46 is about halfway between the first position and the second position so as to permit air to flow through both the face outlet 48 and the foot outlet 50. Upon activation of the fan 38, airflow generated by the fan 38 passes through the airflow path 86 and through the evaporator 40. Upon exiting the second side 72 of the evaporator 40, a portion of the airflow passes through the heater 42 and is then directed by the HVAC housing past the first door 44 to the second door 46, where the airflow is free to exit the HVAC housing 34 through one or both of the face outlet 48 and the foot outlet 50. Airflow that passes through the evaporator 40, but not through the heater 42, such as because the airflow is deflected by the deflector 64, flows upward past the first door 44 and exits the HVAC housing 34 through one or both of the face outlet 48 and the foot outlet 50. The airflow that passed through the heater 42 is warmer than airflow that did not (i.e., airflow that only passed through the evaporator 40). In the bi-level mode, the evaporator 40 is typically not activated. Thus, because airflow exiting the face outlet 48 and the foot outlet 50 is a mixture of airflow that passed through the heater 42 and airflow that only passed through the evaporator 40, airflow experienced by passengers of the vehicle 12 will have a moderate temperature.

With additional reference to FIG. 5c, a heating mode of the rear HVAC system 10 is illustrated. In the heating mode, the first door 44 is in the first position and the second door 46 is in the second position. Upon activation of the fan 38, airflow generated by the fan 38 flows through the airflow path 86 to the evaporator 40 and passes through the evaporator 40 to the first side 78 of the heater 42. Thus, the evaporator 40 and the heater 42 are arranged in the housing 34 such that air flows directly from the evaporator 40 to the first side 78 of the heater 42, which faces the evaporator 40. In the heating mode, the evaporator 40 is not activated, and thus airflow exiting the evaporator 40 generally has the same temperature as when the airflow was generated by the fan 38. As the airflow passes through the heater 42, the airflow is heated. From the second side 80 of the heater 42, the airflow flows out from the foot outlet 50 to the passenger cabin of the vehicle 12 to provide heat for occupants of the vehicle 12, particularly occupants seated in the rear of the vehicle proximate to the rear HVAC system 10.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A rear HVAC system for a motor vehicle, the system comprising:
   a housing configured to be mounted adjacent to a rear wheel well of the motor vehicle;
   an evaporator mounted within the housing;
   a heater mounted within the housing;
   an airflow generator arranged within the housing above both the evaporator and the heater; and
   a curved wall of the housing arranged downstream of the heater and shaped to follow a curvature of the rear wheel well;
   wherein:
      both the evaporator and the heater are between a vehicle floor and a line that is both generally parallel to the floor and tangent to an upper surface of the rear wheel well when the housing is installed in the vehicle;
      both the evaporator and the heater are at the vehicle floor or are arranged equidistant away from the vehicle floor when the housing is installed in the vehicle; and
      the evaporator, the heater, and the airflow generator are between the rear wheel well and a rear end of the motor vehicle.

2. The system of claim 1, wherein the housing is configured to be mounted between the rear wheel well and a D-pillar of the motor vehicle.

3. The system of claim 1, further comprising an airflow deflector integral with the housing between the evaporator and the heater.

4. The system of claim 1, wherein:
   the evaporator includes a first evaporator side and a second evaporator side opposite to the first evaporator side, airflow generated by the airflow generator enters the evaporator at the first evaporator side and exits the evaporator at the second evaporator side;
   the heater includes a first heater side and a second heater side that is opposite to the first heater side, airflow generated by the airflow generator enters the heater at the first heater side and exits the heater at the second heater side; and
   an entirety of the first heater side faces the second evaporator side.

5. The system of claim 1, wherein:
   the evaporator includes a top evaporator end and a bottom evaporator end that is opposite to the top evaporator end;
   the heater includes a top heater end and a bottom heater end that is opposite to the top heater end; and
   the bottom evaporator end and the bottom heater end are generally equidistant from a floor of the vehicle when the housing is installed in the vehicle.

6. The system of claim 5, wherein the top heater end is closer to a base of the housing than the top evaporator end.

7. The system of claim 1, further comprising a door between an outlet of the housing and each of the evaporator and the heater, the door is movable between a first position in which the door is between the evaporator and the heater, and a second position in which the door is between the heater and an inner wall of the housing.

8. The system of claim 1, wherein the housing is configured to direct airflow generated by the airflow generator through the evaporator and the heater in a direction away from the rear end of the motor vehicle and towards a front of the vehicle.

9. A rear HVAC system for a motor vehicle, the system comprising:
   a housing configured to be mounted adjacent to a rear wheel well of the motor vehicle;
   an airflow generator;
   an evaporator mounted in the housing, the evaporator including a first evaporator side and a second evaporator side opposite to the first evaporator side, airflow generated by the airflow generator enters the evaporator at the first evaporator side and exits the evaporator at the second evaporator side;
   a heater mounted in the housing, the heater including a first heater side and a second heater side opposite to the first heater side, airflow generated by the airflow generator enters the heater at the first heater side and exits the heater at the second heater side, the first heater side faces the second evaporator side; and
   a curved wall of the housing arranged downstream of the heater and shaped to follow a curvature of the rear wheel well;
   wherein:
      the airflow generator is arranged within the housing above both the evaporator and the heater;

both the evaporator and the heater are at the vehicle floor or are arranged equidistant away from the vehicle floor when the housing is installed in the vehicle; and the evaporator, the heater, and the airflow generator are between the rear wheel well and a rear end of the motor vehicle.

10. The system of claim 9, wherein:

the housing is configured to be mounted adjacent the rear wheel well and a D-pillar of the motor vehicle; and an entirety of the first heater side faces the second evaporator side.

11. The system of claim 9, wherein both the evaporator and the heater are between a vehicle floor and an upper surface of a rear wheel well when the housing is installed in the vehicle.

12. The system of claim 9, wherein a bottom evaporator end is aligned with a bottom heater end, and both the bottom evaporator end and the bottom heater end are about equidistant from a base of the housing.

13. The system of claim 12, wherein a top evaporator end is further from the base of the housing than a top heater end.

14. The system of claim 9, further comprising a deflector between the evaporator and the heater.

15. The system of claim 9, wherein the housing is configured to direct airflow generated by the airflow generator through the evaporator and the heater in a direction away from the rear end of the motor vehicle and towards a front of the vehicle.

16. A rear HVAC system for a motor vehicle, the system comprising:

a housing configured to be mounted between a rear wheel well and a D-pillar of the motor vehicle, the housing including a base configured to be mounted at a floor of the vehicle;

an evaporator mounted in the housing including a top evaporator end opposite to a bottom evaporator end;

a heater mounted in the housing, the heater including a top heater end opposite to a bottom heater end, the top heater end is mounted closer to the base of the housing than the top evaporator end;

an airflow generator arranged within the housing above both the evaporator and the heater; and a curved wall of the housing arranged downstream of the heater and shaped to follow a curvature of the rear wheel well;

wherein:

both the evaporator and the heater are between a vehicle floor and an upper surface of the rear wheel well when the housing is installed in the vehicle; and both the evaporator and the heater are at the vehicle floor or are arranged equidistant away from the vehicle floor when the housing is installed in the vehicle; and the evaporator, the heater, and the airflow generator are between the rear wheel well and a rear end of the motor vehicle.

17. The system of claim 16, wherein:

the evaporator includes a first evaporator side opposite to a second evaporator side, airflow from the airflow generator enters the evaporator at the first evaporator side and exits the evaporator at the second evaporator side; and the heater includes a first heater side and a second heater side opposite to the first heater side, an entirety of the first heater side faces the second evaporator side.

18. The system of claim 16, wherein the bottom evaporator end and the bottom heater end are each proximate to the base of the housing.

19. The system of claim 16, wherein both the evaporator and the heater are closer to the base of the housing than the airflow generator.

20. The system of claim 16, further comprising a deflector formed in the housing between the evaporator and the heater.

21. The system of claim 16, further comprising a rotary door adjacent to the heater and the evaporator, the rotary door movable between a first position and a second position, in the first position the rotary door obstructs airflow to an outlet of the housing from between both the heater and the evaporator, in the second position the rotary door obstructs airflow to the outlet from the second side of the heater.

22. The system of claim 16, wherein the housing defines a foot outlet and a face outlet.

23. The system of claim 16, wherein the housing is configured to direct airflow generated by the airflow generator through the evaporator and the heater in a direction away from the rear end of the motor vehicle and towards a front of the vehicle.

* * * * *

UNITED STATES PATENT AND TRADEMARK OFFICE
CERTIFICATE OF CORRECTION

| | | |
|---|---|---|
| PATENT NO. | : 9,308,798 B2 | Page 1 of 1 |
| APPLICATION NO. | : 13/525797 | |
| DATED | : April 12, 2016 | |
| INVENTOR(S) | : John Klinkhammer et al. | |

It is certified that error appears in the above-identified patent and that said Letters Patent is hereby corrected as shown below:

Title Page, at column 1, (75) Inventors, line number 3, after Windsor, insert --, ON--;

Title Page, at column 1, (73) Assignee, line number 1, delete "Ameria" and insert --America--.

Claims

At column 8, claim number 16, line number 4, after "vehicle", delete "and".

Signed and Sealed this
Fourteenth Day of June, 2016

Michelle K. Lee
*Director of the United States Patent and Trademark Office*